United States Patent [19]

Hauser et al.

[11] Patent Number: 5,106,417
[45] Date of Patent: Apr. 21, 1992

[54] AQUEOUS PRINTING INK COMPOSITIONS FOR INK JET PRINTING

[75] Inventors: Hanspeter Hauser; Karin Reiniger, both of Aesch, Switzerland

[73] Assignee: Ciba-Geigy Corporation, Ardsley, N.Y.

[21] Appl. No.: 601,147

[22] Filed: Oct. 22, 1990

[30] Foreign Application Priority Data

Oct. 26, 1989 [CH] Switzerland ............ 3868/89

[51] Int. Cl.$^5$ ............................................. C09D 11/02
[52] U.S. Cl. ..................... 106/20; 106/476; 106/493; 106/499
[58] Field of Search ............ 106/22, 20, 23, 476, 106/493, 499

[56] References Cited

U.S. PATENT DOCUMENTS

| | | |
|---|---|---|
| 4,395,288 | 7/1983 | Eida et al. . |
| 4,666,519 | 5/1987 | Akiyama et al. ............ 106/22 |
| 4,771,129 | 9/1988 | Kawashita et al. . |
| 4,793,860 | 12/1988 | Murakami et al. . |
| 4,892,775 | 6/1990 | Song ........................... 106/22 |

FOREIGN PATENT DOCUMENTS 1588777 4/1981 United Kingdom .

OTHER PUBLICATIONS

Derwent Abst. 88-343001/48.
Derwent Abst. 95974D/52.
Chem. Abst. 96 105979m (1982).
Derwent Abst. 85-233867/38.
Chem. Abst. 104, 111454m (1986).
Derwent Abst. 86-316291/48.
Chem. Abst. 106, 121559e.

*Primary Examiner*—William R. Dixon, Jr.
*Assistant Examiner*—Helene Klemanski
*Attorney, Agent, or Firm*—Luther A. R. Hall

[57] ABSTRACT

Aqueous, low viscosity, stable printing ink compositions suitable for drop-on-demand ink jet printing contain specific selected amounts of a solid pigment preparation, a water-soluble organic solvent, a humectant and water so that the compositions resist clogging ink jet nozzles and give prints of excellent image resolution which are resistant to water and migration.

9 Claims, No Drawings

AQUEOUS PRINTING INK COMPOSITIONS FOR INK JET PRINTING

The present invention relates to aqueous printing ink compositions for ink jet printing.

Aqueous printing inks for ink jet printing are disclosed in numerous publications. Such inks comprise essentially a water-soluble organic dye in the form of a salt, a polyalcohol or an ether thereof as wetting agent, as optional further component a minor amount of an binder, and water. Examples of such printing ink compositions are disclosed, for example, in German patent 3,711,052, European patent 0,194,885 or Japanese Patent Kokai Sho 63-256,668. The proposal has also been made to use pigments as colorants, especially carbon black, in which case a normally polymeric dispersant and a binder are concurrently used. Attention is drawn in this connection to Japanese Patent Kokai 56-147,861, 60-152,575 and 61-235,478. Solid pigment preparations based on an acidic polyacrylic resin are disclosed in German patent 2,729,892, but these preparations are used not for ink jet printing, but as printing ink compositions in printing and coating systems by means of conventional methods such as gravure, flexographic, screen, letterpress or offset printing, or by coating, spraying, brushing and doctor coating.

Printing inks for ink jet printers need to have in particular optimum performance properties such as viscosity, stability, drying speed and surface tension, so that no precipitate forms when, for example, ink supply is interrupted for an extended time and the nozzles of the ink jet printer do not become clogged by the ink after prolonged non-use (a property often called DOD, i.e. drop-on-demand). Furthermore, complete water-resistance is often required for many fields of use—a property which cannot be achieved with the water-soluble organic dyes which are disclosed in the publications referred to above.

It has now been found that aqueous printing ink compositions based on pigments and acidic polyacrylic resins are eminently suitable for ink jet printing and have excellent properties such as DOD, viscosity, print image resolution and excellent resistance to water and migration.

Accordingly, the present invention relates to an aqueous printing ink composition for ink jet printing, which comprises a) 0.1 to 20% by weight of a solid pigment preparation containing 10 to 90% by weight of a pigment and 90 to 10% by weight of a polyacrylic resin which contains carboxyl groups, b) 0 to 30% by weight of a water-dilutable organic solvent, c) 0.5 to 20% by weight of a humectant, and d) water.

Preferred polyacrylic resins which contain carboxyl groups are those which are obtained by polymerisation of acrylic acid or of acrylic acid and other acrylic monomers such as acrylic acid esters. It is, however, possible to use other polyacrylic compounds such as polymeric methacrylic or crotonic acids or similar polymeric carboxylic acids if they contain a substantial number of carboxylic acid groups as substituents. It is above all important that the polyacrylic resin is soluble in aqueous medium or in a medium which contains water-dilutable organic solvents, with or without the addition of bases. Such resins are commercially available in acidic or partially or completely neutralised form, for example ®Aquahyde, ®Surcol, ®Elvacit, ®Zinpol, ®Neocryl, ®Carboset or ®Joncryl resins Preferred acrylic resins are products which consist essentially of the three structural elements ethyl acrylate, methyl methacrylate and acrylic acid or methacrylic acid. It is also possible to use butyl acrylate, ethyl methacrylate and butyl methacrylate.

The acid value of the polyacrylic resin is conveniently from 50 to 300, preferably from 60 to 120, and the resin preferably has an average molecular weight Mw of 30,000 to 60,000 (determination, for example, by light scattering).

It is preferred to use from 0.5 to 5% by weight of the solid pigment preparation [component a)].

The solid pigment preparation eligible for use in the practice of this invention will preferably contain from 30 to 70% by weight of pigment and 70 to 30% by weight of polyacrylic resin which contains carboxyl groups. Most preferably it will contain from 50 to 60% by weight of pigment.

To prepare the solid pigment preparations it is possible to use inorganic pigments such as carbon black, titanium dioxide or iron oxides, as well as organic pigments, preferably those of the phthalocyanine, anthraquinone, perinone, indigoid, thioindigoid, dioxazine, diketopyrrolopyrrole, isoindolinone, perylene, azo, quinacridone and metal complex series, for example metal complexes of azo, azomethine or methine dyes, and also classical azo dyes of the $\beta$-oxynaphthoic acid and acetoacetarylideseries, or metal salts of azo dyes, in which case attention may have to be paid to their resistance to alkali. Mixtures of different organic pigments or mixtures of an inorganic pigment with an organic pigment can also be used.

Particularly suitable preparations are carbon black preparations or preparations with organic pigments containing preferably 50–60% by weight of carbon black or of an organic pigment and 40–50% by weight of polyacrylic resin.

In addition to the eligible components, the pigment preparations may also contain auxiliaries such as stabilisers and fillers.

The pigment preparations can be prepared in different manner, for example by adding the pigment to a solution of the polyacrylic resin in alkali and subsequently precipitating the resin by acidification, by spray drying the pigment/resin solution, or preferably by mixing a water-insoluble acidic resin with the pigment continuously or batchwise in a kneader. When preparing the pigment preparation by the first method it is possible to use alkalies which can then be neutralised. When using a kneader, it is possible to precipitate the polyacrylic resin from an aqueous ammoniacal solution direct in the kneader by acidification, to decant the water separated from the melt of the base resin, to add pigment, solvent and, if appropriate, sodium chloride as grinding assistant, and to knead the concentrate to the desired fineness of the pigment and to process it to the dry preparation.

Eminently suitable are solid pigment preparations which are prepared in a kneader and which preferably contain 50 to 60% by weight of pigment, especially the fine quality carbon black used in conventional printing inks.

Representative examples of water-dilutable organic solvents are aliphatic $C_1$–$C_4$ alcohols such as methanol, ethanol, n-propanol, isopropanol, n-butanol, isobutanol or tert-butanol, aliphatic ketones such as acetone, methyl ethyl ketone, methyl isobutyl ketone or diacetone alcohol, and also polyols, cellosolve and carbitols such as ethylene glycol, diethylene glycol, triethylene glycol, glycerol, propylene glycol, ethylene glycol monomethyl or monoethyl ether, propyleneglycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, and N-methyl-2-pyrrolidone, 2-pyrrolidone, dimethyl formamide and dimethyl acetamide. A preferred solvent is isopropanol or N-methyl-2-pyrrolidone. Mixtures of the above mentioned solvents can also be used.

The amount of organic solvent in the printing ink composition is preferably 2 to 10% by weight.

To prevent clogging of the nozzles, polyhydric alcohols can be used as humectants, for example ethylene glycol, diethylene glycol, triethylene glycol, tetraethylene glycol, propylene glycol, dipropylene glycol, glycerol and, more particularly, polyethylene glycols which preferably have a molecular weight from 200 to 800. The amount of polyhydric alcohol in the aqueous printing ink is preferably from 2 to 15% by weight.

The aqueous printing ink compositions may conveniently further contain a base, preferably an aliphatic base such as ammonia, aminomethylpropanol, dimethylaminomethylpropanol, dimethylethanolamine, triethanolamine, morpholine, piperazine or piperidine, or mixtures thereof, so that the base volatilises when the printing ink dries and the film formed therefrom becomes water-insoluble. Preferred bases are ammonia and/or aminomethylpropanol. The concentration of the base will be determined such that the free carboxyl groups of the acrylic resin are present in amine salt form.

The printing ink composition is conveniently neutral to weakly alkaline and has a pH in the range from 7 to 11.

To control the viscosity and/or the surface tension and the conductivity of the printing ink composition within specific ranges it is further often advantageous—especially for continuous printing—to use additives or suitable modifiers. To this end it is possible to use any known substances which control the viscosity or the surface tension so long as said substances do not have any undesired effects on the inks and the recording material. Exemplary of such viscosity modifiers are polyvinyl alcohol, hydroxypropyl cellulose, carboxymethyl, cellulose, hydroxyethyl cellulose, methyl cellulose, water-soluble acrylic resins and polyvinylpyrrolidone. Exemplary of surface tension control agents are anionic and nonionic surface active agents such as polyethylene glycol ether sulfate, ester salts and the like as anionic compounds; and polyoxyethylene alkyl ethers, polyoxyethylene alkylphenyl ethers, polyoxyethylene alkyl esters, polyoxyethylene sorbitan alkyl esters, polyoxyethylene alkylamines and similar compounds as nonionic compounds.

Such viscosity modifiers and surface tension control agents can in principle be added to achieve a sufficient flow behaviour in the nozzle at a rate corresponding to the recording speed, and also to prevent droplet formation of the recording material (ink) at the outer surface of the nozzle connected to the release orifice, and to prevent the ink from spreading on the recording substrate.

The conductivity is conveniently in a range from ca. 1000 to 10 000 $\mu$S/cm. Typical examples of ions are lithium or quaternary ammonium ions, for example of lithium hydroxide, tetraethylammonium acetate, sodium nitrate or sodium carbonate.

In addition to the above mentioned components it is also possible to add to the printing ink compositions of this invention, depending on the utility, preservatives, biocides, surfactants, light stabilisers and pH regulators. Suitable pH regulators are, typically, lithium hydroxide or lithium carbonate, quaternary ammonium hydroxide and quaternary ammonium carbonate. Preservatives and biocides are, typically, sodium dehydroacetate, 2,2-dimethyl-6-acetoxydioxane or ammonium thioglycolate.

The printing ink compositions of this invention can be applied to a very wide range of media, for example to paper and coated papers such as wallpapers, fancy papers and, in particular, packing papers, to metals and plastics materials such as aluminium foils, plasticised and rigid PVC sheets, polyamide and polystyrene sheets, cellulose acetate films, and also polyethylene, polypropylene and polyester films, as well as pretreated films thereof (for example, films pretreated by corona discharge), and to glass, ceramics, cellophane and varnished cellophane.

Especially preferred in the practice of this invention is the printing of packing materials based on paper and plastics.

The printing ink compositions of this invention are prepared by stirring the pigment preparation into water or a mixture of water and solvent or into an acrylic resin solution. No additional milling operation is necessary for dispersing the pigment. The following procedures may, for example, be employed:

Preparation of a colourant concentrate in water or in a mixture of water and solvent, for example in water, water/ethanol, water/isopropanol, water/organic base, water/organic base/alcohol, or in an acrylic resin solution diluted with a minor amount of solvent. The concentration of the pigment preparation is governed by the desired viscosity of the concentrate and depends, for example, on the solvent. Preferred concentrations are in the range from ca. 5 to 20% by weight of pure organic pigment and are rather higher if inorganic pigments are used, for example 25–50% by weight. The alcohol concentration is preferably from 10 to 30% by weight, and the amount of organic base ranges from 0.5 to 3% by weight. The concentrates so obtained may then be further mixed or diluted with other modifiers in the desired ratio.

Stirring the pigment preparation directly into the solution or suspension of the acrylic resin, with or without the addition of a minor amount of solvent or diluent or other modifiers for controlling the viscosity and/or the surface tension. Printing ink compositions for direct use or supply can be prepared in this manner.

A preferred process for the preparation of the printing ink compositions of this invention comprises incorporating a pigment preparation consisting of 50 to 60% by weight of a pigment and 40 to 50% by weight of a polyacrylic resin in water or in aqueous alcohol, with the addition of ammonia or an aliphatic amine, for example a mono-, di- or trialkylamine, an alkanolamine or a heterocyclic amine such as morpholine or piperazine, into the desired acrylic resin, such that the resin is dissolved and the pigment is finely dispersed in the application medium.

The pH of the ink concentrate is preferably in the range of 7.5 to 8.5, while the pH of the final printing ink composition is in the range from 9.5 to 10.5. If necessary, for example to remove coarse particles from the dispersion, it may be advantageous to subject the final printing ink compositions before use to clarifying filtration with a suitable filter or a combination of filters, for example with a 5 μm glass filter (Whatman) or 5 μm membrane filter (Sartorius), or preferably with a combination of these two filters.

Application of the printing ink composition to the substrate, for example a sheet of paper, is made by methods which are known per se using a commercially available ink jet printer such as a drop-on-demand printer, a bubble jet printer or a continuous jet printer, for example with a ®Ripat 5600 J Word Processor (supplied by Ricoh Co. Ltd.) or an ink jet printer available from Numaco AG (CH) (containing an Epson printhead with piezoelectric element control). The printhead consists ordinarily of several fine nozzles, each having a diameter of 10 to 60 μm and being of different configuration. The ink jet printer with piezoelectric element nozzles are individually pressure-controlled so that the ink can be sprayed consistently on to the substrate. The printhead of this last mentioned ink jet printer has 28 fine nozzles.

The printing ink compositions of this invention have excellent properties such as simple formulation, optimum viscosity, surface tension, conductivity and shelf-life, and they do not clog the nozzles. The images obtained with them are clear and easily legible and have excellent fastness to light, weathering, water and migration as well as good wettability of non-absorbent print substrates. The printing inks of this invention readily permit regulation to viscosities of 2 to 5 mPa·s, while nozzles of greater diameter allow viscosities of up to 20 mPa·s.

Furthermore, images and characters of the finest resolution can be obtained.

The printing ink compositions of this invention may also contain minor amounts of organic dyes suitable for this utility; but printing ink compositions without the addition of organic dyes are preferred because images of superior resistance to water and alkali can thereby be obtained. Particularly for very fine nozzles, minor amounts of organic dye permit an increase in colour intensity with retention of low viscosity. The water-resistance of the prints, however, is reduced percentagewise in relation to the amount of dye used.

In the following Examples parts and percentages are by weight, unless otherwise stated.

EXAMPLES 1–3

Preparation of the Pigment Preparations

Example 1

A mixture of 100 g of an aqueous solution of isopropanol which contains 40% of an acrylic resin in the form of the ammonium salt (®Zinpol 1519, ex Zinchem Corp., having an acid value of 93), 50 g of ethyl alcohol, 150 g of water and 40 g of carbon black PRINTEX ®300 (Degussa), is milled for 13 hours in a 11 batch sand mill. The concentrate is diluted with 100 g of water, separated from the grinding media, and added in a thin jet to a weakly acidic solution of 1000 g of water and 20 ml of 15% hydrochloric acid. The pigment preparation precipitates in coarse crystals and is isolated by filtration, washed free of acid and salt, vacuum dried at 60°–70° C., and then forced through a ½ mm sieve. A black pigment preparation of good quality amd containing 50% of pigment is obtained.

Example 2

90 g of carbon black PRINTEX ®300 (Degussa), 90 g of an acid acrylic copolymer (®Aquahyde 100; acid value 74), 450 g of milled sodium chloride and 80 g of diacetone alcohol are kneaded for 3 hours at ca. 60° C. in a laboratory kneader. The concentrate is disintegrated by addition of 250 g of a saturated solution of sodium chloride. Granulation is brought to completion by adding 100 g of ice to the cooled material. The product is thereafter collected by filtration and the filter residue is washed free of solvent and salt with water. The dry granular material is conveniently forced through a sieve having a mesh size of 0.5 mm to give a 50% black pigment preparation of good quality.

Example 3

The procedure of Example 2 is repeated, replacing the acrylic resin used therein with the acidic acrylic resin ®Carboset XL-27 (acid value 74) in such a ratio as to give a 60% by weight black pigment preparation; this pigment preparation is of equally good quality as that prepared in Example 2.

USE EXAMPLES 4–6

Example 4 a) Preparation of a Printing Ink Concentrate

Formulation:
25% by weight of the black preparation of Example 3,
52.5% by weight of water,
20% by weight of isopropanol,
1.5% by weight of aminomethylpropanol and
1% by weight of 25% ammonia.

Incorporation:
40 g of water and 15 g of isopropanol are charged to a glass vessel and then 25 g of the pigment preparation, 1.5 g of aminomethylpropanol and 1 g of ammonia are stirred in. The suspension is then dispersed with a dissolver at 10 000 rpm (corrsponding to an initial speed of 15 m/sec). Then, with normal stirring, 12.5 g of water and 5 g of isopropanol are added.

b) Preparation of the final printing ink composition 3.0 g of the above printing ink concentrate (containing 25% by weight of pigment preparation) are then diluted, with normal stirring, with 85.8 g of water, 0.2 g of aminomethylpropanol, 2 g of polyethylene glycol (mol. wt. 600) and 9 g of isopropanol. Depending on the desired conductivity, an ion-forming salt can also be added, for example in an amount of 0.3–1 g.

The dispersion so obtained is clarified by filtration with a combination of two filters to remove coarse particles [Whatman 5 μm glass filter and Sartorius 5 μm membrane filter]. The resultant printing ink composition has a viscosity of 3 to 3.5 mPa·s (Haake viscosimeter, according to the MB DIN-E program; 250 m$^{-1}$). The particle size of the printing ink has a D-84 value of 0.107 μm (measured by the Joyce-Loebel method; this value means that 84% of the particles are smaller than 0.107 μm).

c) Marking

The printing ink composition so obtained is then applied with a commercially available ink jet printer supplied by Numaco (Switzerland) [Epson printhead with 28 nozzles, tunnel-shaped; base of the nozzle 95 μm; height of the nozzle 17 μm] to a linear substrate (sheet of quality paper coated with a top coat and laminated on the back with aluminium), and the printed paper is examined for the following properties:

Visual assessment of the clarity of the characters produced: the characters are clear, sharp, have good contrast and are easily legible. This applies not only to the large characters (e.g. letters 33 cm in height, 18 cm in width and 3.5 cm thick) but also to the small characters (e.g. letters having a thickness of 0.1 mm, a width of ca. 1.2 mm and a height of 1.0 mm).

Water-resistance of the characters: The specimen is immersed for 1 minute in warm water of 30° C. and then removed, after which the density of the immersed specimen is measured with a Macbeth densitometer. The water-resistance of the characters is calculated from the initial density $d_0$ and the value $d_2$ in accordance with the following formula:

$$\frac{d_o - d_2}{d_o} \cdot 100\%$$

The value obtained is 100% and therefore proves that the characters obtained with the tested printing ink have excellent water-resistance.

In addition, the characters are distinguished by excellent lightfastness.

Example 7

95 g of the red disazo pigment ®Cromophtal Red 2B (C.I. No. 221), 95 g of an acid acrylic copolymer ®Carboset XL 27 (acid value 72–76, m.p. 106° C.), 570 g of finely ground sodium chloride and 75 g of diacetone alcohol are kneaded for 4 hours in a kneader. The concentrate is then disintegrated by the addition of 250 g of a saturated solution of sodium chloride, after which granulation is brought to completion by adding 100 g of ice to the cooled material. For microgranulation, the granular stock so obtained is then subjected to wet milling in a toothed colloid mill with ca. 5000 g of water. The microgranules are then collected by filtration and washed free of solvent and salt with water. The filter cake is dried in a vacuum shelf-drier at 80° C. The dry product is conveniently forced through a sieve having a mesh size of 0.5 mm to give a 50% red pigment preparation.

Example 8

The procedure of Example 7 is repeated, using 95 g of of the blue β-copper phthalocyanine pigment (crude product). The concentrate is kneaded for 6 hours at ca. 60° C. After granulating and working up as described in Example 7, a blue 50% pigment preparation is obtained.

Examples 9 and 10 a) Preparation of the Printing Ink Concentrate

Formulation: 30% by weight of the red and blue pigment preparation obtained in Examples 7 and 8 respectively, 52% by weight of water, 15% by weight of isopropanol, 1.5% by weight of aminomethylpropanol and 1.5% by weight of 25% aqueous solution of ammonia.

Incorporation: 52 g of water and 15 g of isopropanol are charged to a glass vessel. Then 30 g of the above red and blue pigment preparations, 1.5 g of aminomethylpropanol and 1.5 g of ammonia are stirred in. The suspension is then dispersed for 30 minutes with a dissolver at 10 000 rpm (corresponding to a speed) of 15 m/s).

b) Preparation of the Final Printing Ink

With normal stirring, 4.0 g of the above printing ink concentrate obtained in each of these Examples (containing 30% by weight of pigment preparation) are diluted with 87.8 g of water, 0.2 g of aminomethylpropanol, 4 g of polyethylene glycol (mol. wt. 600) and 4 g of N-methyl-2-pyrrolidone. Depending on the desired conductivity, a an ion-forming salt can be added, for example in an amount of 0.3 to 1 g. Filtration is effected as described in the above Use Examples 4–6.

Viscosity of the printing ink composition: 4–5 mPa·s; particle size D-84 of the blue ink: 0.247 and of the red ink: 0.256.

Marking with the ink compositions is made in accordance with Examples 4–6, part c). These ink compositions have excellent allround properties.

The recording and storage properties such as the continuous writing test and the storage test can be determined by test methods which are known per se, for example in accordance with Example 4 of German patent 2 927 062. The printing ink compositions of this invention have good allround fastness properties and are storage-stable.

Example 11

Pigment/Dye Combination

The preparation of the printing ink concentrate and incorporation are as described in Example 4 above.

Preparation of the Final Printing Ink Composition

Formulation: 1% by weight of the black preparation of Example 3, 6% by weight of ®Irgaspers Schwarz RU (Acid Black C.I. No. 52; 1,2-chromium complex), 84.8% by weight of water, 0.2% by weight of aminomethylpropanol, 4% by weight of N-methyl-2-pyrrolidone and 4% by weight of polyethylene glycol (mol. wt. 600). Incorporation: 84.8 g of water, 0.2 g of aminomethylpropanol, 4 g of N-methyl-2-pyrrolidone and 4 g of polyethylene glycol (600) are mixed with a stirrer. Then 1 g of the above black preparation (containing 25% by weight of carbon black) and 6 g of ®Irgaspers Schwarz RU are added and the mixture is mixed with a stirrer. The resultant dispersion is clarified by filtration as described in Example 4 b) above. Measured viscosity as in Example 4 b).

What is claimed is:

1. An aqueous printing ink composition for drop-on-demand type ink jet printing which comprises
   (a) 0.5 to 5% by weight of a solid pigment preparation containing 30 to 70% by weight of a pigment and 70 to 30% by weight of a polyacrylic resin which resin contains carboxyl groups and has an acid value in the range of 50 to 300 and an average molecular weight $M_w$ in the range of 30,000 to 60,000;
   (b) 2 to 10% by weight of a water-dilutable organic solvent selected from the group consisting of $C_1$-$C_4$-alkanols, lower aliphatic ketones, cellosolves, carbitols, N-methyl-2-pyrrolidone, 2-pyrrolidone, N,N-dimethylformamide, N,N-dimethylacetamide and mixtures thereof;

(c) 2 to 15% by weight of a humectant selected from the group consisting of ethylene glycol, diethylene glycol, triethylene glycol, tetraethylene glycol, propylene glycol, dipropylene glycol, glycerol and poly(ethylene glycol); and (d) water; and with the viscosity of the aqueous ink jet printing ink composition being in the range of 2 to 5 mPa-s.

2. An aqueous printing ink composition according to claim 1, wherein the polyacrylic resin consists essentially of the three structural elements ethyl acrylate, methyl methacrylate and acrylic acid or methacrylic acid.

3. An aqueous printing ink composition according to claim 1, wherein the acid value is in the range from 60 to 120.

4. An aqueous printing ink composition according to claim 1, wherein the pigment preparation is a carbon black preparation or a preparation containing an organic pigment.

5. An aqueous printing ink composition according to claim 1, wherein component b) is isopropanol or N-methyl-2-pyrrolidone.

6. An aqueous printing ink composition according to claim 1, wherein the humectant is polyethylene glycol having a molecular weight in the range from 200 to 800.

7. An aqueous printing ink composition according to claim 1, which additionally contains ammonia, aminomethylpropanol or mixture thereof.

8. An aqueous printing ink composition according to claim 1, which additionally contains suitable modifiers for controlling the viscosity, the surface tension or both of said composition.

9. An aqueous printing ink composition according to claim 1, which additionally contains a minor amount of organic dye.

* * * * *